(12) United States Patent
Mizuguchi et al.

(10) Patent No.: US 8,695,167 B2
(45) Date of Patent: Apr. 15, 2014

(54) HANDLE DEVICE OF WORK MACHINE

(75) Inventors: Hiroshi Mizuguchi, Wako (JP); Taiyo Onodera, Wako (JP); Yosuke Toyohira, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 13/165,994

(22) Filed: Jun. 22, 2011

(65) Prior Publication Data
US 2011/0308045 A1 Dec. 22, 2011

(30) Foreign Application Priority Data

Jun. 22, 2010 (JP) ................................. 2010-141479

(51) Int. Cl.
*B25G 3/32* (2006.01)

(52) U.S. Cl.
USPC ........................................................ 16/422

(58) Field of Classification Search
USPC ........... 16/422, 436, 438, 444–445, 900, 429, 16/DIG. 25, 408, 110.1; 280/47.371, 280/47.315, 655, 655.1; 182/16; 248/140–142, 221.11, 222.11–222.13, 248/408, 409, 681; 294/58, 178, 85, 82.24, 294/82.31, 167; 81/177.2, 177.7; 220/696, 220/762, 765–766; 172/350; 74/145, 536, 74/551.7
See application file for complete search history.

(56) References Cited

U.S. PATENT DOCUMENTS

| | | | | |
|---|---|---|---|---|
| 3,167,346 | A * | 1/1965 | Miller | 294/82.34 |
| 4,708,357 | A * | 11/1987 | Soderbaum | 280/304.1 |
| 5,590,440 | A | 1/1997 | Pelt et al. | |
| 6,742,995 | B1 * | 6/2004 | Wood et al. | 417/234 |
| 7,496,990 | B2 * | 3/2009 | Qiao | 16/437 |
| 7,597,340 | B2 * | 10/2009 | Hirose et al. | 280/655.1 |
| 7,849,564 | B2 | 12/2010 | Miller | |
| 8,113,315 | B2 * | 2/2012 | Farley et al. | 182/86 |
| 2003/0222428 | A1 * | 12/2003 | Shieh | 280/651 |

(Continued)

FOREIGN PATENT DOCUMENTS

| EP | 2138686 A1 | 12/2009 |
|---|---|---|
| GB | 1322771 A | 7/1973 |

(Continued)

OTHER PUBLICATIONS

European Search Report dated Oct. 28, 2011, issued in corresponding European Patent Application No. 11170852.5. Cited in co-pending U.S. Appl. No. 13/166,393.

*Primary Examiner* — Victor Batson
*Assistant Examiner* — Matthew Sullivan
(74) *Attorney, Agent, or Firm* — Westerman, Hattori, Daniels & Adrian, LLP

(57) ABSTRACT

A work machine handle device having a foldable handle is disclosed. As the handle is to be changed from a folded-up state to a use state, the handle is turned about a frame as a turning fulcrum. An actuating protuberance provided integrally to a turning member of a clamp body is pushed by a handle engaging/disengaging part provided to a front end of the handle, and the turning member is caused to turn. The handle engaging/disengaging part is held from either side and automatically restrained by a clamp mechanism. When the handle is changed from the use state to the folded-up state, a restraining mechanism is operated to release the engagement between the restraining mechanism and a distal end of the turning member. The turning member is turned by a return force of a spring provided to the clamp body, the handle engaging/disengaging part ceases to be restrained, and the handle can be folded up.

5 Claims, 15 Drawing Sheets

(56) References Cited

U.S. PATENT DOCUMENTS

| | | | |
|---|---|---|---|
| 2003/0222429 A1* | 12/2003 | Shieh | 280/651 |
| 2007/0163566 A1* | 7/2007 | Johnson et al. | 125/13.01 |
| 2009/0255758 A1* | 10/2009 | Farley et al. | 182/88 |
| 2010/0072717 A1* | 3/2010 | Liska | 280/47.371 |
| 2010/0132163 A1* | 6/2010 | Hasei et al. | 16/421 |
| 2012/0042477 A1* | 2/2012 | Junk et al. | 16/429 |

FOREIGN PATENT DOCUMENTS

| | | |
|---|---|---|
| JP | 2007-115457 A | 5/2007 |
| JP | 4226404 B2 | 2/2009 |
| JP | 2010-007577 A | 1/2010 |

* cited by examiner

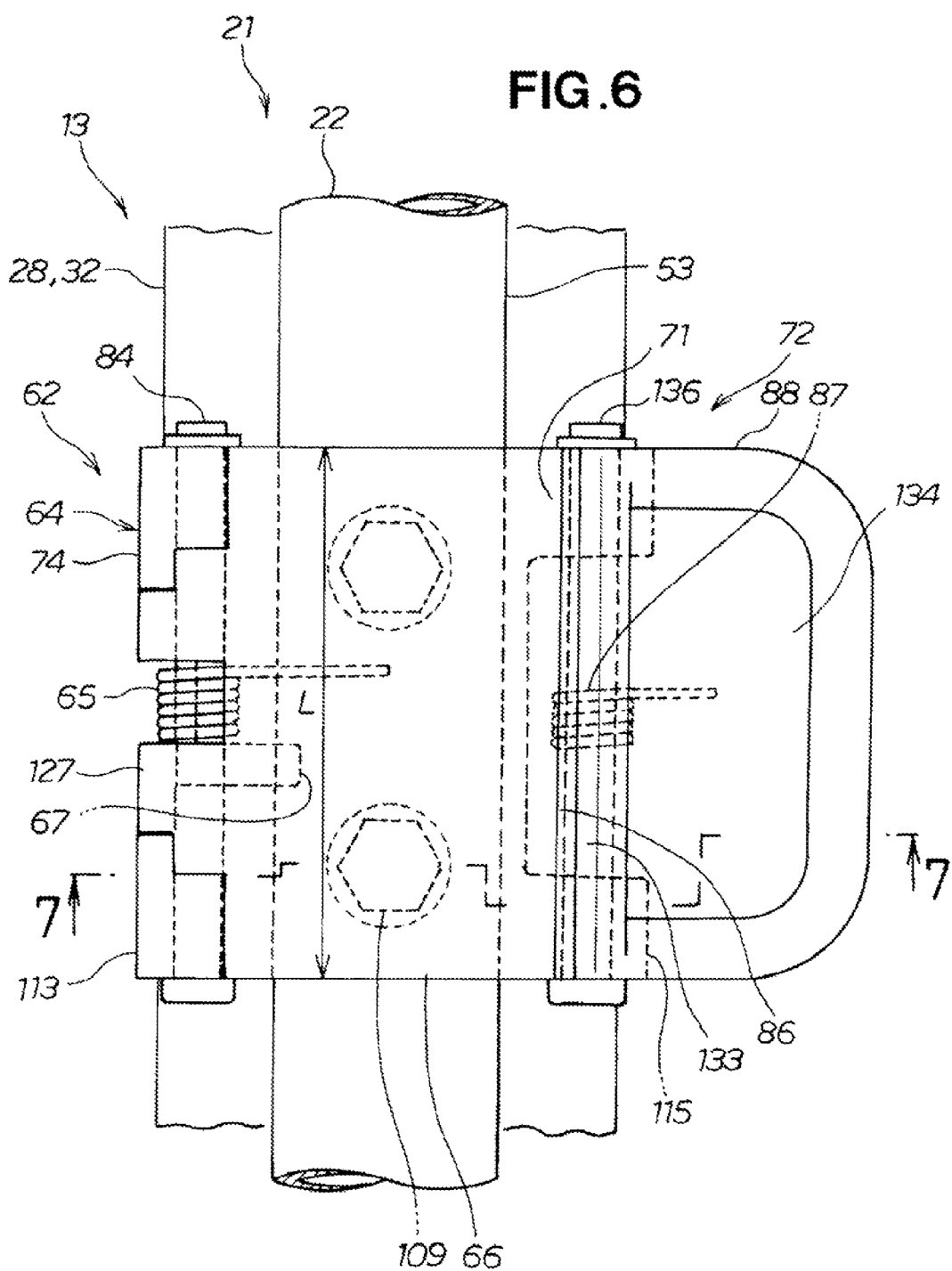

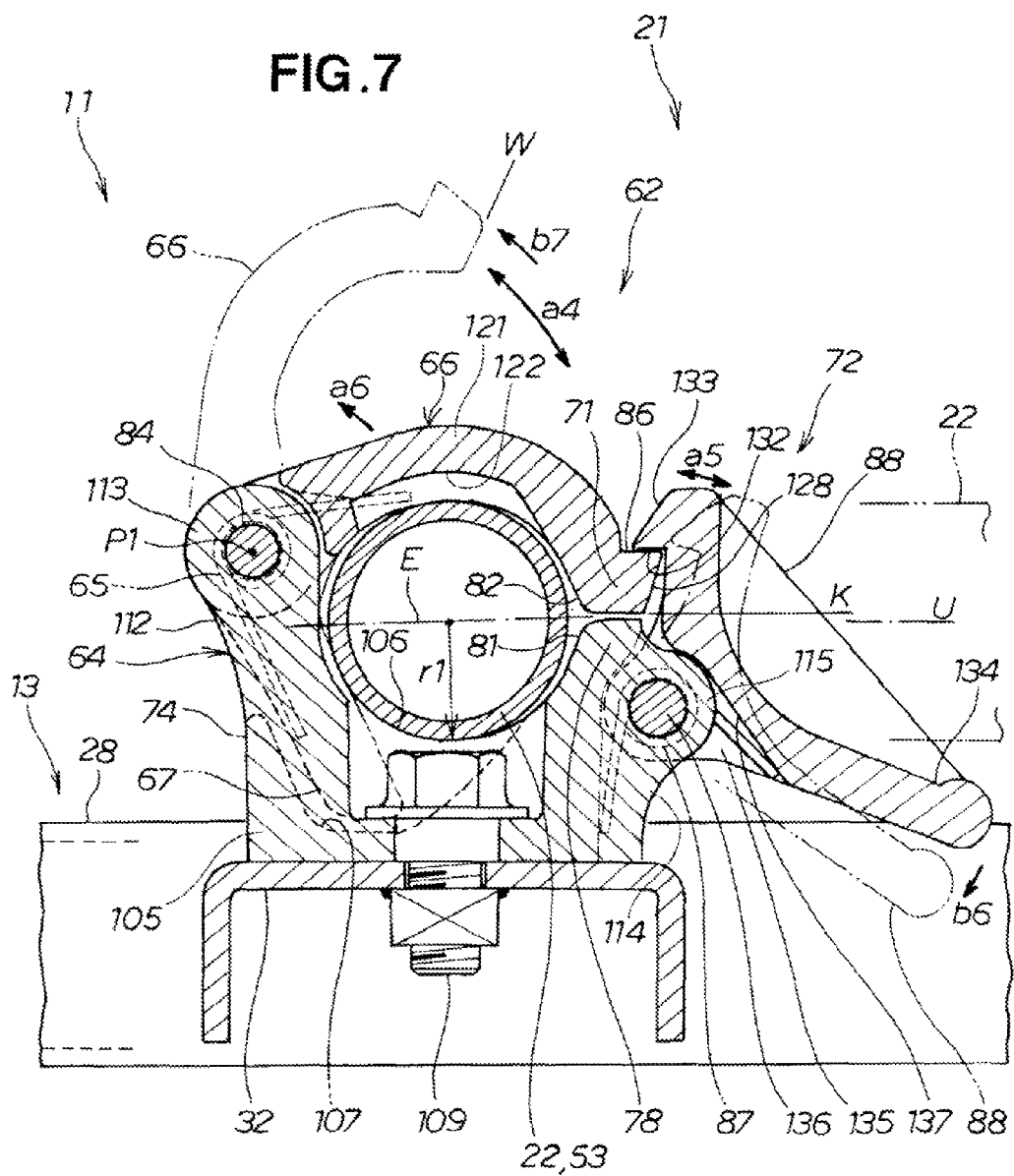

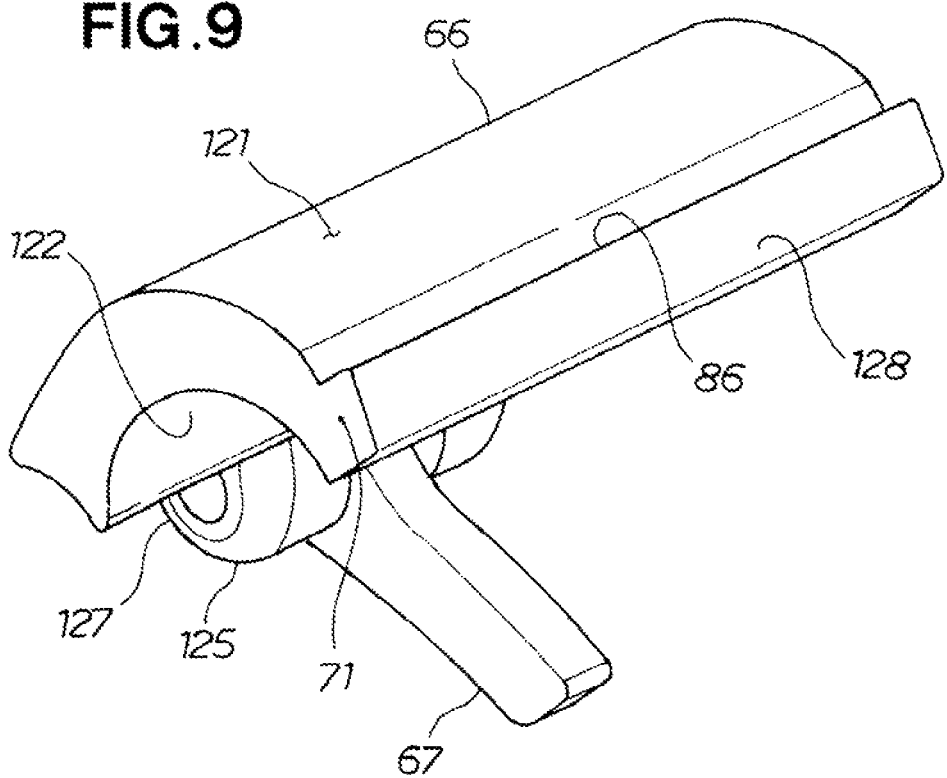

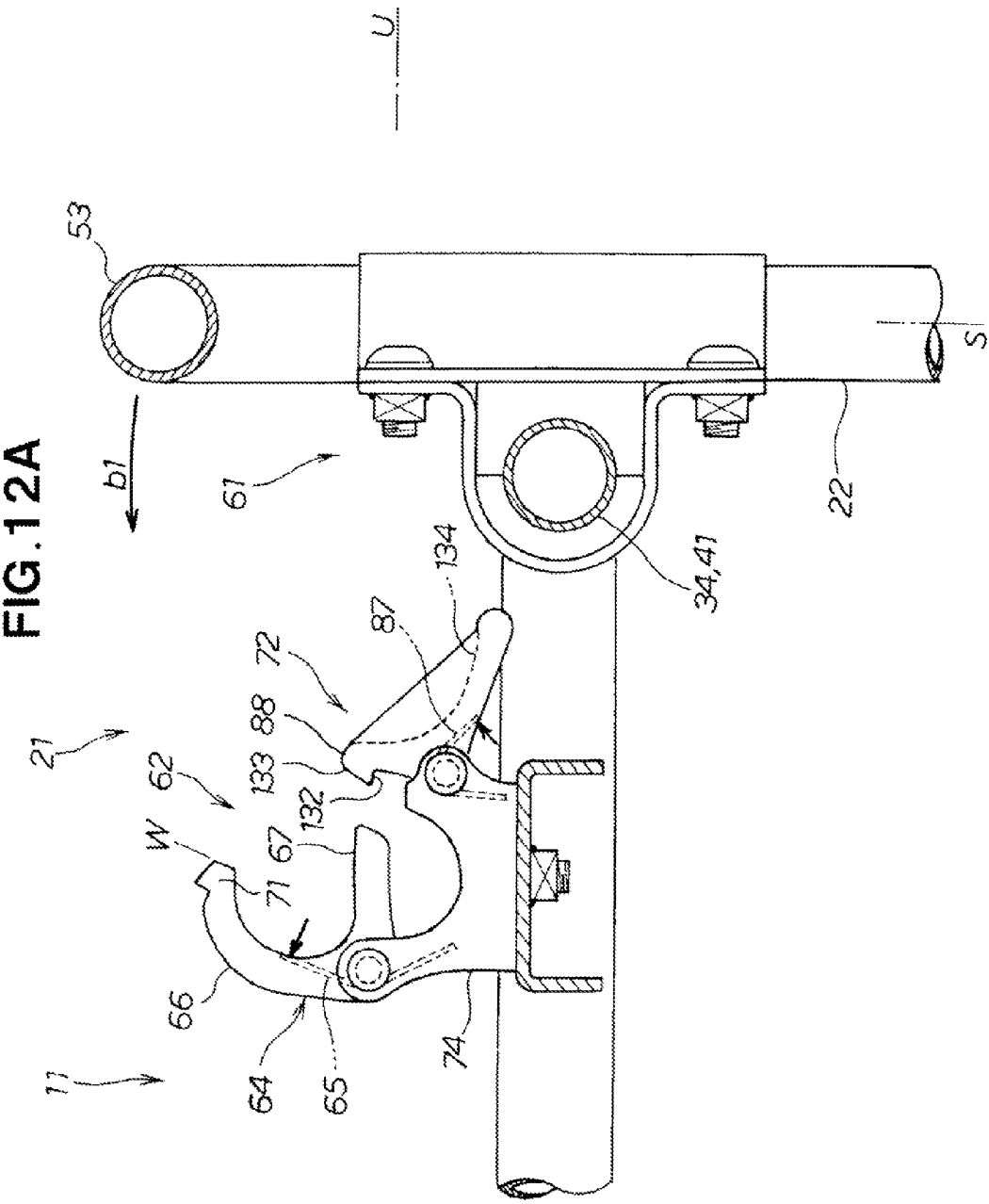

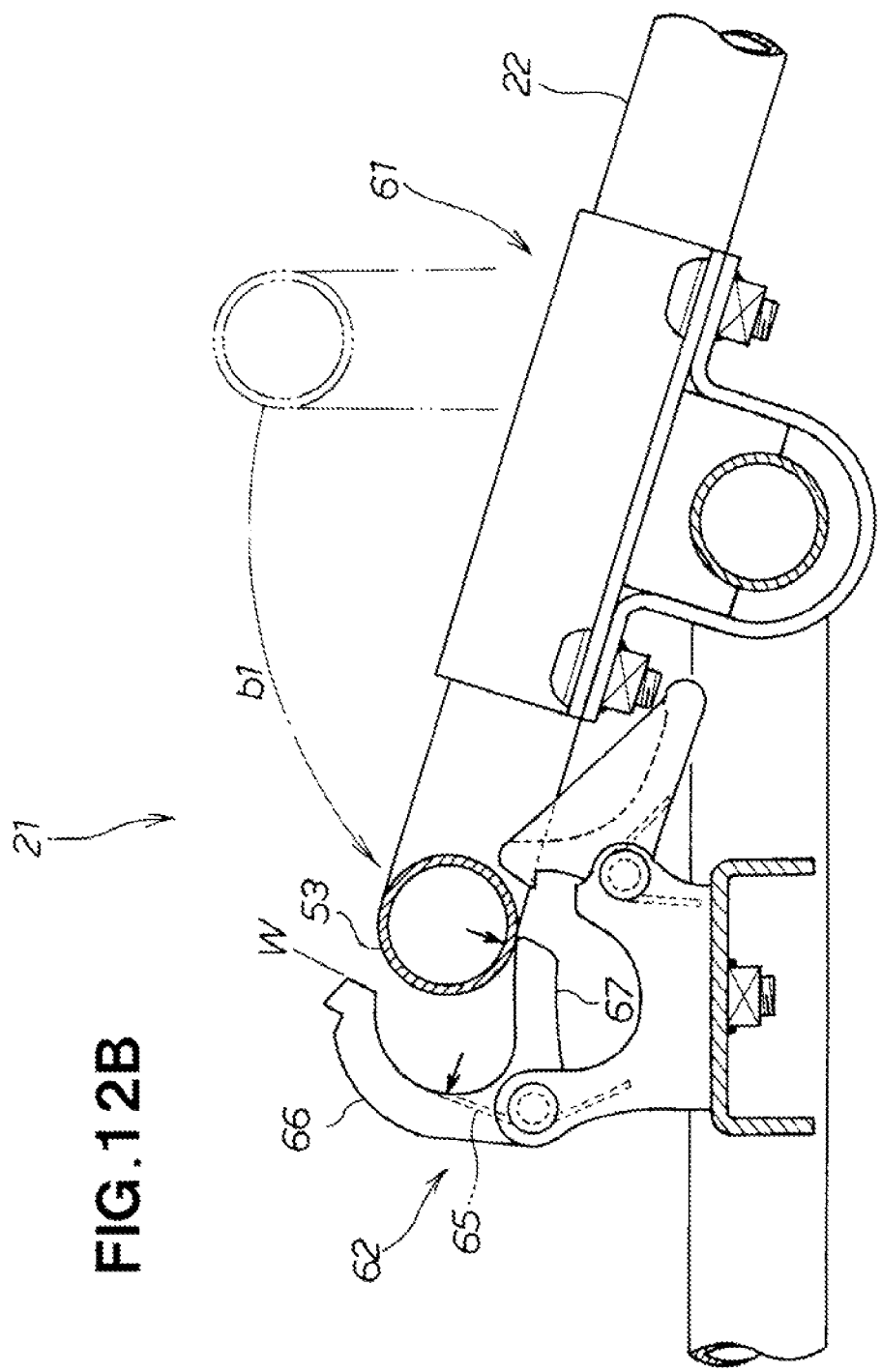

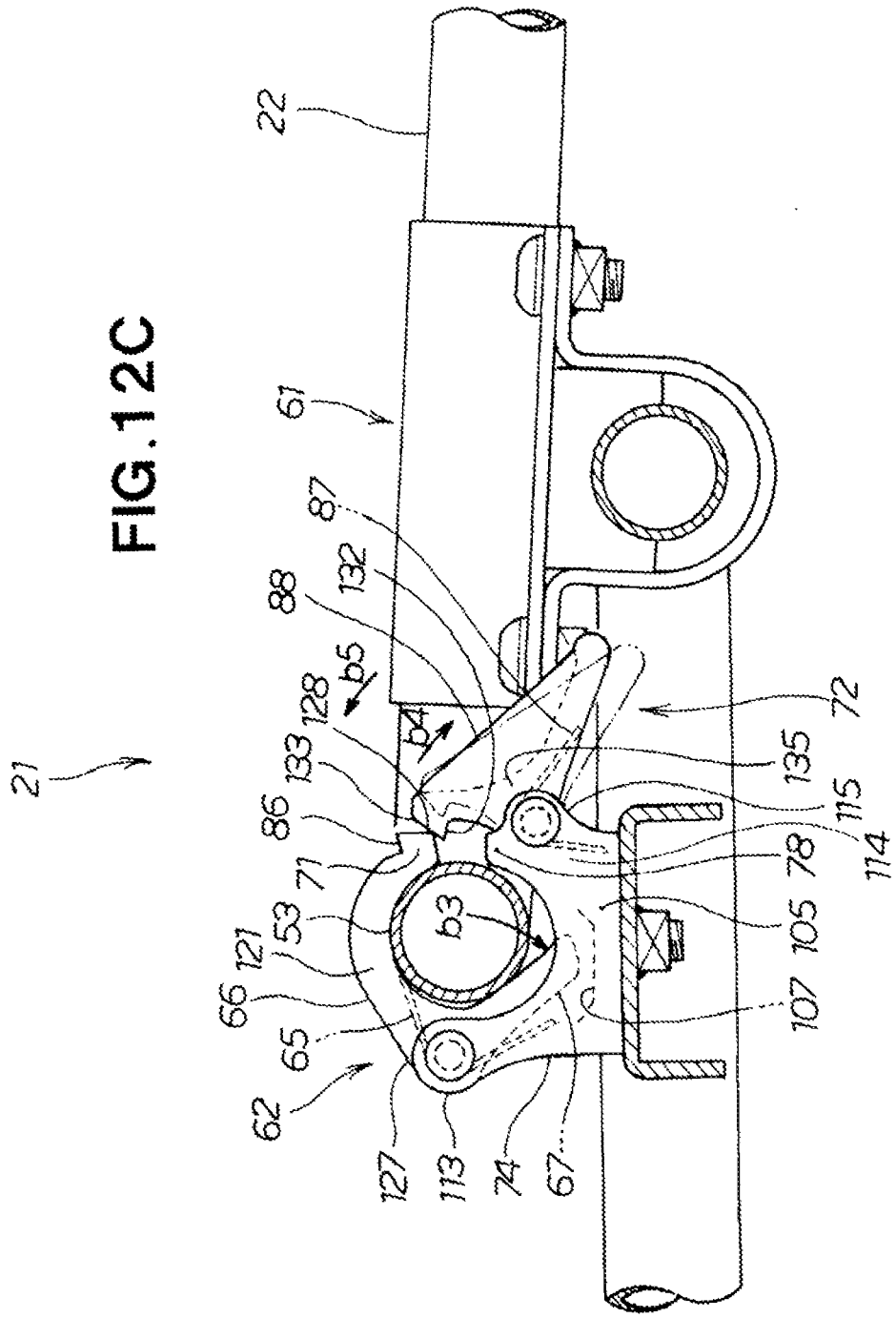

HANDLE DEVICE OF WORK MACHINE

FIELD OF THE INVENTION

The present invention relates to a handle device of a work machine, such as a power generator and a pump, having a frame provided with a foldable handle.

BACKGROUND OF THE INVENTION

Japanese Patent No. 4226404 B discloses a work machine comprising a handle device provided to a steel chassis frame, wherein the handle folds up during transportation or movement. The handle device has a handle bracket fastened to a plate-shaped bracket provided to the chassis frame, a supporting base plate held by a bolt passed through a disc spring and fastened to the handle bracket so as to not turn, and a handle fitted with the supporting base plate. A manual locking mechanism engages with the handle bracket when the handle is in its use position.

However, a problem is presented in the handle device described above in that its structure is complicated and it has a large number of components.

Japanese Patent Application Laid-Open Patent Publication No. 2007-115457 A (JP 2007-115457 A) discloses a handle device in which a handle, which is a rod bent into a foldable U shape, is connected at one end to a plate attached to a chassis frame composed of a steel pipe, the other end of the rod is fixed in place by being passed through the handle and the plate, and the rod can be removed and turned.

However, although the handle device disclosed in JP 2007-115457 A has a simple structure, a problem is presented in that since the handle turns of its own weight when the pin (rod) is removed, the handle must first be held in the use position and then the handle must be lowered while being supported, and both the force and direction with which the handle is turned are unstable.

Furthermore, another problem is that when the handle is fixed in place (locked) or turned, the pin must be removed and inserted, and the handling thereof is complicated.

SUMMARY OF THE INVENTION

It is therefore an object of the present invention to provide a handle device of a work machine which has a simple structure for fixing (locking) the handle in a detachable manner in a use position, and which also has a simple operation for fixing (locking) the handle in the use position.

According to an aspect of the present invention, there is provided a handle device of a work machine, which device comprises: a frame for carrying a work device; a transportation/movement handle attached in a foldable manner to the frame, extending outwardly of the frame, and having left and right grip parts at distal ends; a handle turning mechanism for supporting attachment parts of the handle that intersect the frame in such a manner as to be turnable about the frame as a turning fulcrum; and a clamp mechanism for detachably fixing a handle engaging/disengaging part to the frame, the handle engaging/disengaging part continuing from the attachment parts, extending forwardly of the frame and positioned on a side opposite the grip parts, wherein the clamp mechanism comprises: a clamp body for clamping the handle engaging/disengaging part by closing; a spring of the clamp body, for holding the clamp body in an open standby state; a actuating protuberance which, when closed against a spring force of the spring, extends from a turning member of the clamp body toward the handle engaging/disengaging part so as to contact and be pushed by the handle engaging/disengaging part; and a restraining mechanism for automatically restraining a distal end of the clamp body by a spring force when the clamp body is closed due to the actuating protuberance being pushed further and brought nearer to the frame.

Therefore, the structure whereby the handle is detachably fixed (locked) in the use position is simplified. Only one clamp mechanism need be provided to the frame, and the structure whereby the handle is detachably fixed (locked) in the use position is simplified.

When the handle is turned form the folded up position to the use position and the handle engaging/disengaging part (the other end) facing the grip parts (the one end) of the handle is engaged with the clamp body which is opened in a standby state, the clamp body is also turned and automatically closed by the actuating protuberance pushed by the handle engaging/disengaging part, and the closed state is automatically restrained by the restraining mechanism.

When the restraining mechanism is pushed against the spring force when the handle is folded up from the use state, the clamp body opens up.

Therefore, the clamp mechanism can be operated by a single pressing action, and the operation of fixing, or in other words clamping (locking) the handle is simplified, as is the operation of releasing the clamp (the lock) of fixing the handle.

It is preferred that the clamp body be comprised of a fixed member fixed to the frame and the turning member turnably attached to the fixed member and provided with the actuating protuberance, the fixed member have an open end with an inside surface being curved and in proximity to the handle engaging/disengaging part, and the turning member have a distal end with an inside surface being curved and in proximity to the handle engaging/disengaging part.

Therefore, when the handle engaging/disengaging part is turned and inserted into the clamp body which is opened in a standby state, interference between the handle engaging/disengaging part and the inside surface of the open end of the clamp body can be prevented. In other words, even if there is a comparatively large degree of variation in the precision of assembling the handle turning mechanism and the clamp mechanism, the variation can be absorbed and the structure of the handle device is effectively simplified.

It is preferred that the clamp body be comprised of a fixed member fixed to the frame and the turning member turnably attached to the fixed member and provided with the actuating protuberance, and the restraining mechanism be comprised of a fixed pawl formed on a distal end of the turning member and a movable pawl member turnably attached to the fixed member so as to engage the fixed pawl by a spring force of a return spring.

When the handle engaging/disengaging part is turned and fitted in the clamp body opened in a standby state, the movable pawl of the movable pawl member automatically engages with the fixed pawl part of the opened turning member. The operation of clamping the handle is thus simplified.

The spring may comprise a helical torsion spring, with a direction of the torsion load coinciding with a direction in which the clamp body opens. As a result, the helical torsion spring need only be inserted through the fulcrum axis of the clamp body, and the structure is simplified.

BRIEF DESCRIPTION OF THE DRAWINGS

Certain preferred embodiments of the present invention will be described in detail below, by way of example only, with reference to the accompanying drawings, in which:

FIG. 6 is an enlarged view showing area 6 of FIG. 2;

FIG. 7 is a cross-sectional view taken along line 7-7 of FIG. 6;

FIG. 9 is a perspective view showing a turning member of FIG. 7;

FIGS. 12A through 12C are views illustrating locking engaging/disengaging actions of the handle of the handle device according to the first embodiment.

DETAILED DESCRIPTION OF THE PREFERRED EMBODIMENTS

First Embodiment

Reference is now made to FIGS. 1 through 12 showing a work machine 11 according to a first embodiment. In the work machine 11 according to the present embodiment, a power generator is shown as an example.

Figure 1:
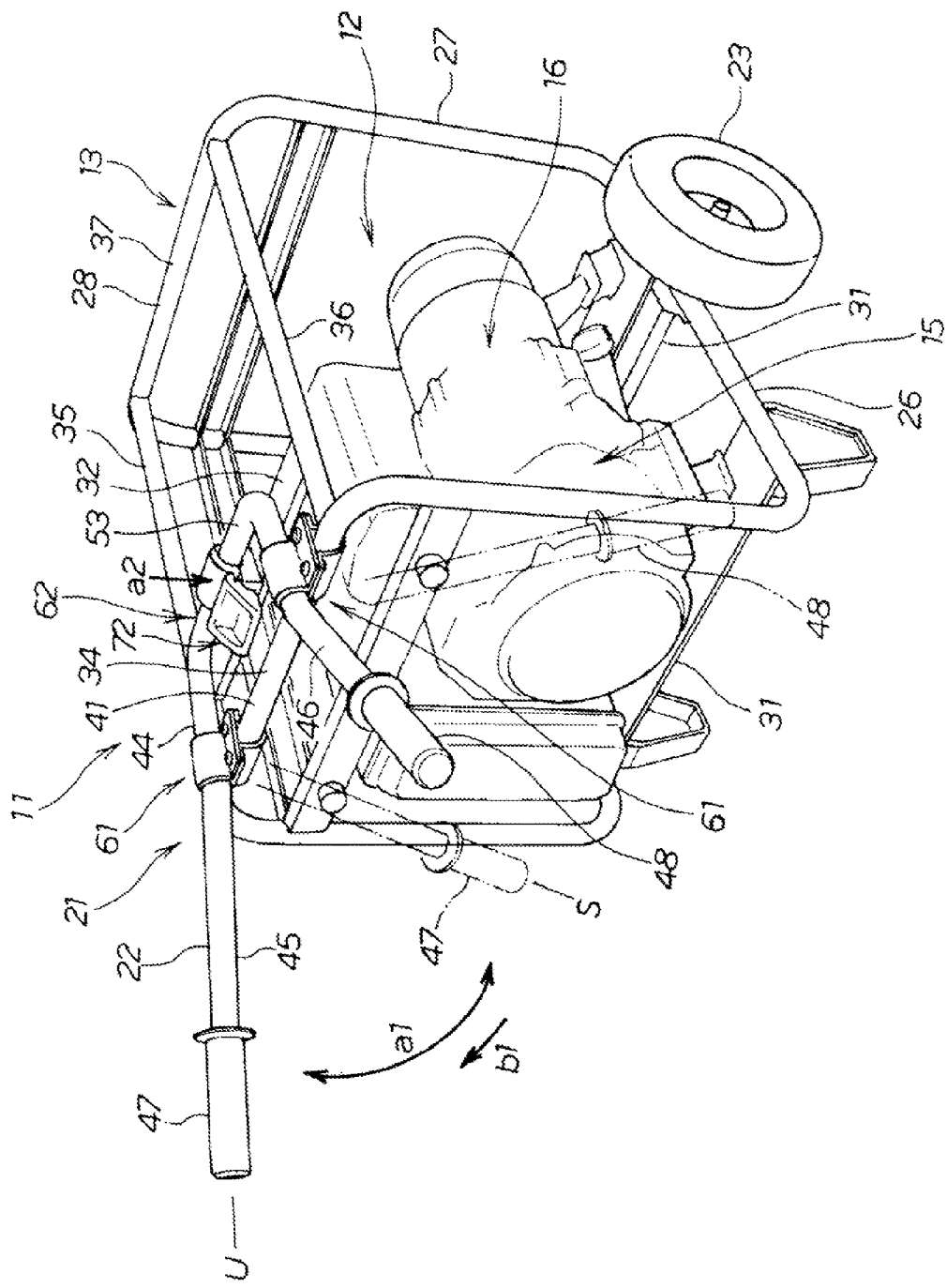
FIG. 1 is a perspective view illustrating a work machine according to a first embodiment of the present invention.

The work machine 11 comprises a work device 12 mounted on a frame 13, as shown in FIG. 1. This work device 12 includes a drive device (an engine) 15 and a power generation part 16. A handle 22 held on a handle device 21 can be folded up.

Another possible example of the work device 12, other than the power generator, is a pump device which deals with water or another fluid.

Figure 2:
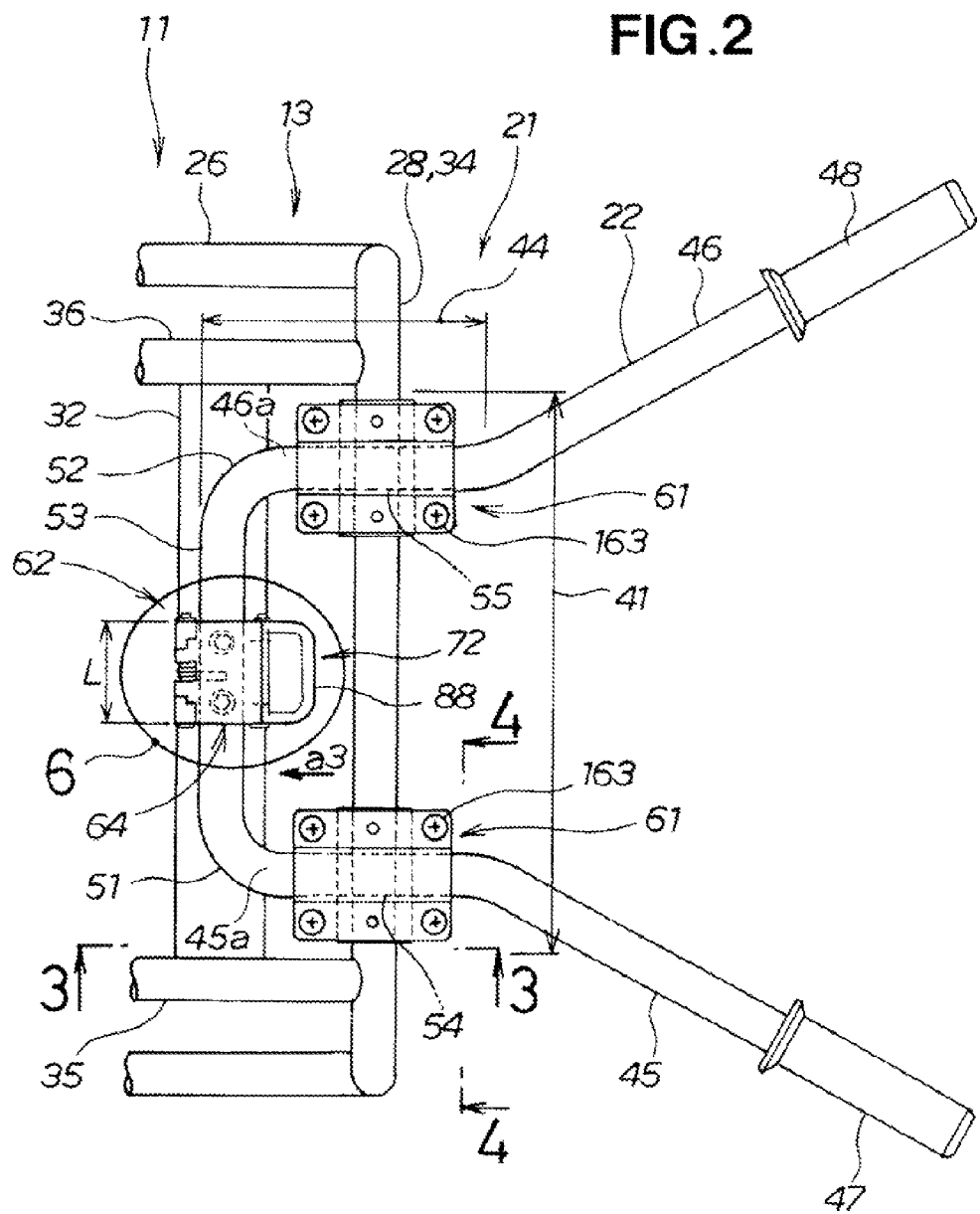
FIG. 2 is a top plan view of the handle device shown in FIG. 1.

The handle device 21 is attached to the frame 13 so that the handle 22 can be folded up in the direction of arrow a1 as shown in FIGS. 1 and 2. The use position of the handle 22 is shown by U, and the folded position of the handle 22 is shown by S. When the handle 22 is in the use position U, the work machine 11 is moved by grasping the handle 22 by hand and pushing using the wheels 23. When the work machine is loaded onto an automobile, two people lift the machine by taking hold of the handle 22 and the frame 13.

The frame 13 is formed into a substantial square and is composed of a bottom frame part 26, four vertical frame parts 27 standing upright from the bottom frame part 26, and a top frame part 28 spanning as a continuation between the vertical frame parts 27. In other words, the frame 13 includes members, e.g., bottom cross base plates 31 and a top cross frame part 32 attached to a pipe frame.

The wheels 23 and the cross base plates 31, 31 are attached to the bottom frame part 26. On the cross base plates 31, the engine 15 and the power generation part 16 are carried on the cross base plates 31, 31.

The top frame part 28 is composed of a first cross frame part 34 to which the handle 22 is attached, first and second side frame parts 35, 36 continuing from the first cross frame part 34, a second cross frame part 37, and the top cross frame part 32 which is in proximity to the first cross frame part 34. The handle 22 is attached to a handle support part 41 of the first cross frame part 34.

The handle 22 is created by bending a steel pipe. Specifically, a support part 44 supported on the frame 13 is plastically deformed into a U shape. A first arm part 45 is attached as a continuation to one end of this U-shaped support part 44. A second arm part 46 is attached to the other end. Seen in a plan view, the first and second arm parts 45, 46 extend rearward out to the exterior of the work machine 11 so as to widen outward. The first and second arm parts 45, 46 have a first grip part 47 and a second grip part 48 at their respective ends.

Due to a 90° plastic deformation of a first bent part 51 and a second bent part 52, the U-shaped support part 44 has a handle engaging/disengaging part (a stopper part) 53 extending in the vehicle width direction, and first and second attachment parts 54, 55 extending in parallel in the vehicle forward-backward direction.

The handle engaging/disengaging part 53 is engaged to and disengaged from a clamp mechanism 62 provided to the top cross frame part 32 when the handle 22 is turned to the use position U.

The first attachment part 54 and the second attachment part 55 are orthogonal to the first cross frame part 34 of the frame 13, and are attached so as to be capable of turning relative to the first cross frame part 34 (in the direction of arrow a1).

When the handle 22 is lifted up, causing the work machine 11 to be lifted up while the handle 22 is in the use position U, force is created in the handle engaging/disengaging part 53 as shown by arrow a2 and transmitted to the top cross frame part 32 of the work machine 11.

Next, the configuration of the handle device 21 of the work machine 11 according to the first embodiment will be described based on FIGS. 1 through 7.

The handle device 21 has a structure in which a handle 22 for transportation and movement, which has a first grip part 47 and a second grip part 48 extending to the rear of the vehicle body at the distal ends, is attached in a foldable manner to the frame 13 on which a power generator or another work device 12 is carried.

The handle device 21 comprises the first attachment part 54 and the second attachment part 55 which are attachment parts of the handle 22 that intersect the frame 13, a handle turning mechanism 61 for supporting the frame 13 to be capable of turning about a turning fulcrum P, and the clamp mechanism 62 for detachably fixing the handle engaging/disengaging part 53 to the frame 13. The handle engaging/disengaging part 53 continues from the first attachment part 54 and the second attachment part 55, continuing as extending parts 45a, 46a extending into the frame 13 (in the direction of arrow a3 shown in FIGS. 2 and 3).

Figure 3:
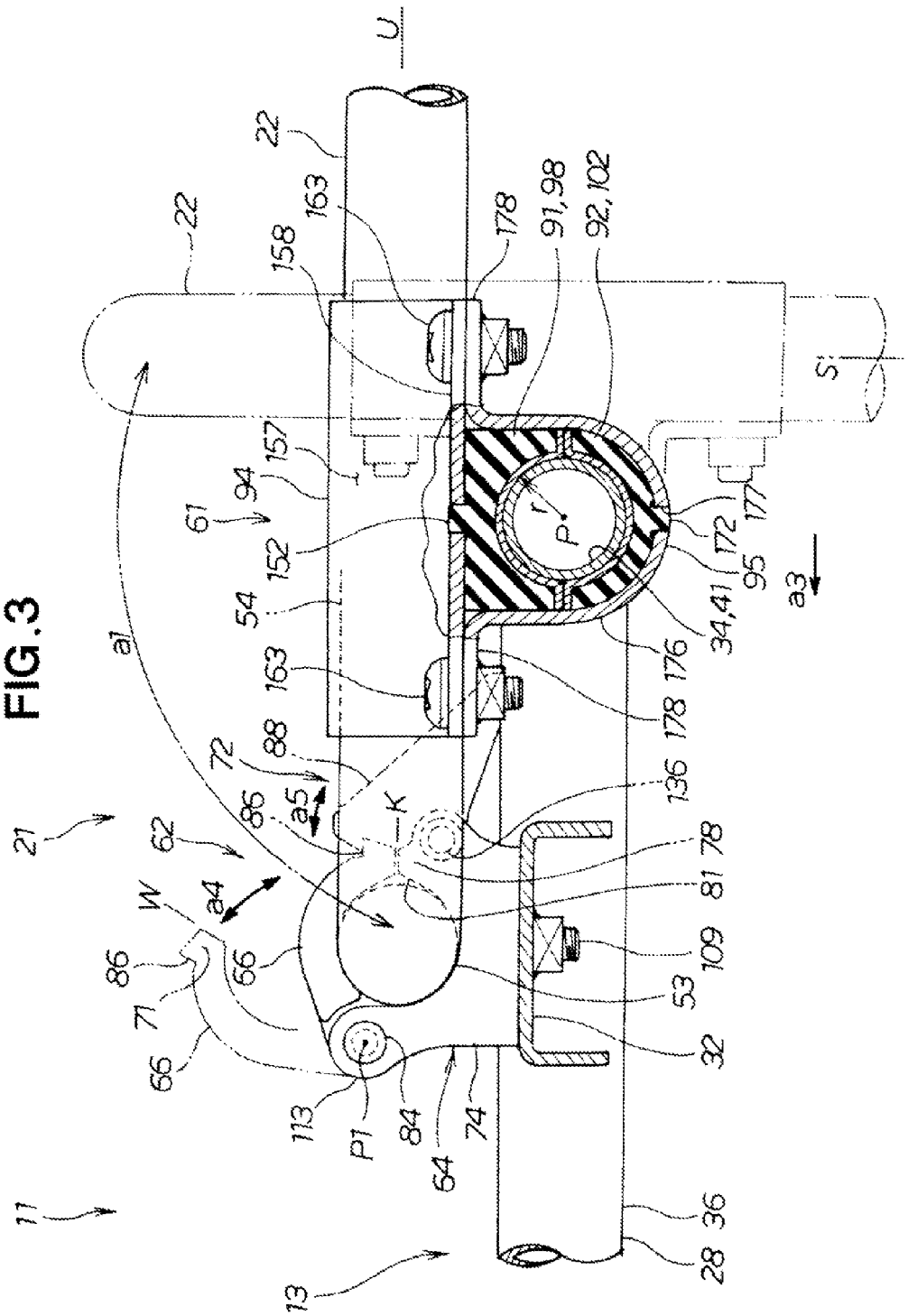
FIG. 3 is an enlarged cross-sectional view taken along line 3-3 of FIG. 2.
Figure 4:
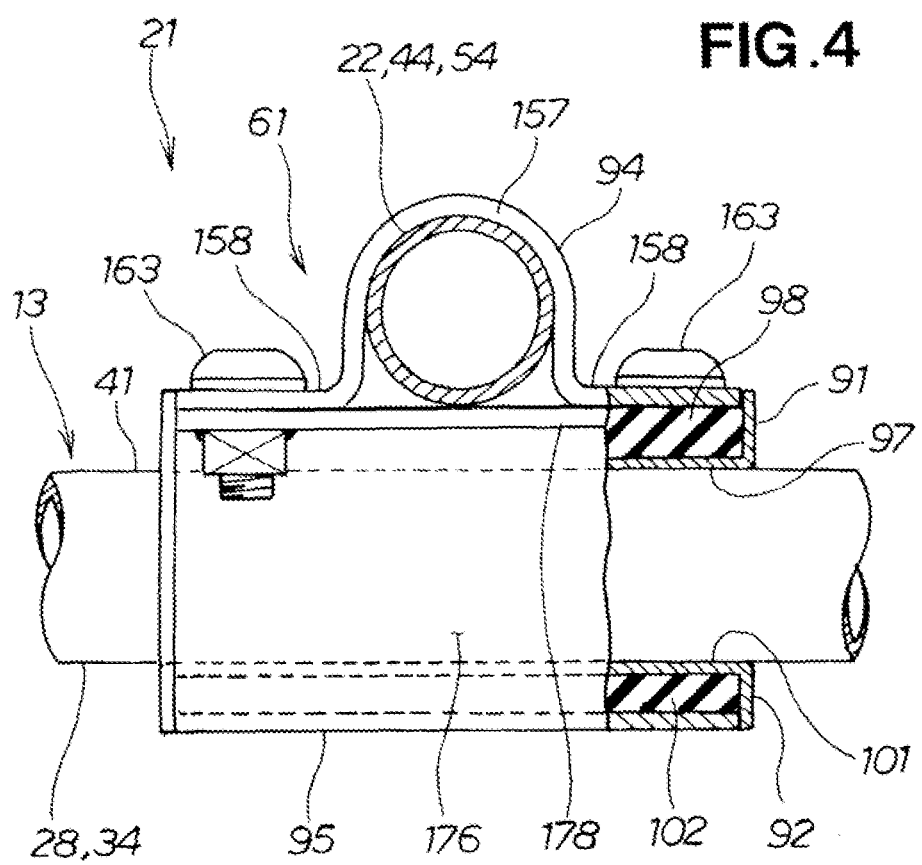
FIG. 4 is an enlarged cross-sectional view along line 4-4 of FIG. 2.
Figure 5:
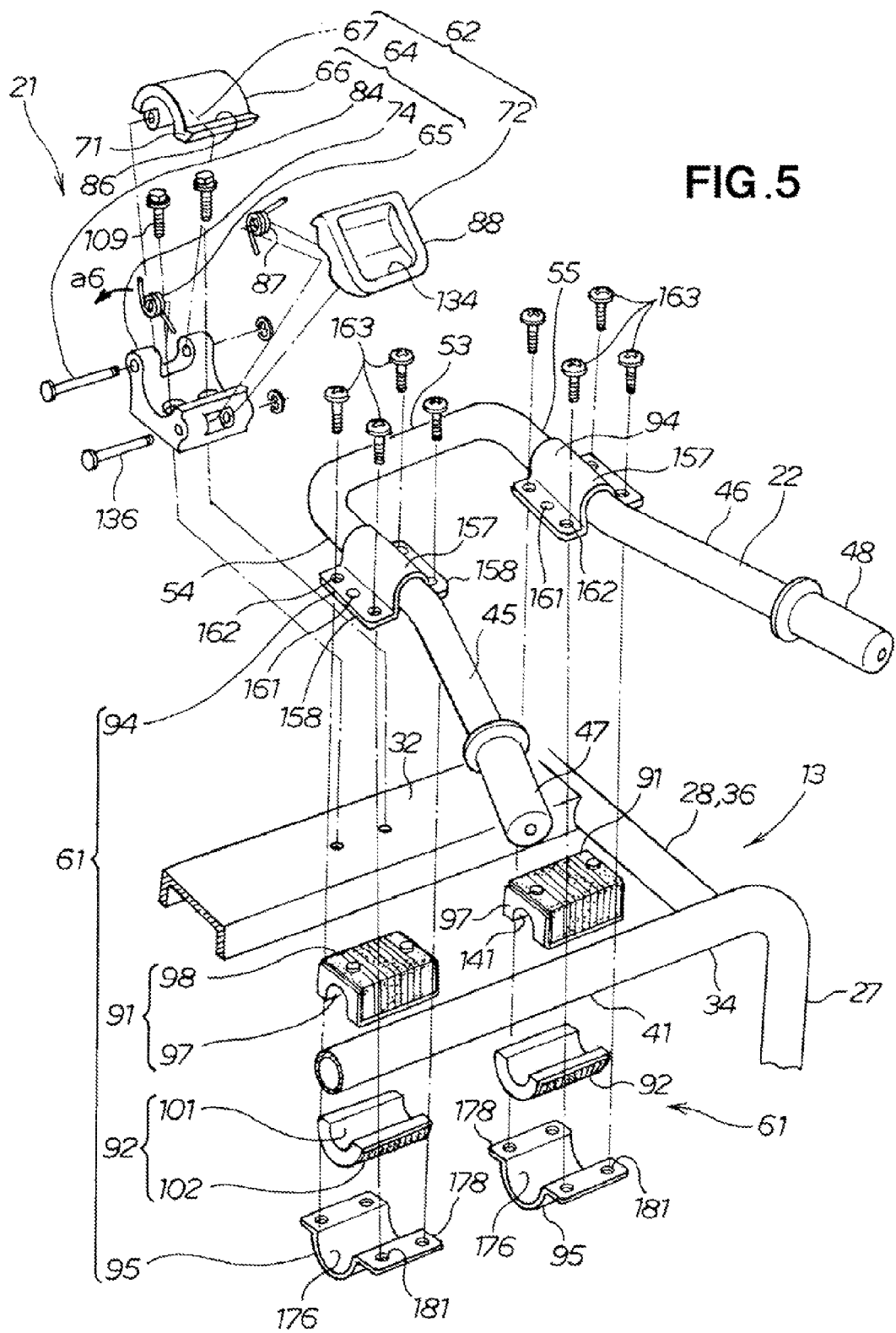
FIG. 5 is an exploded view of the handle device shown in FIG. 1.

The clamp mechanism 62 includes a clamp body 64 for engaging and disengaging the handle engaging/disengaging part 53, as shown in FIGS. 3 and 12. The clamp body 64 has a fixed member 74 fixed to the frame 13, and a turning member 66 attached to the fixed member 74 to be capable of turning in the direction of arrow a4 shown in FIG. 3. P1 shown in FIG. 3 is the fulcrum of the turning member 66. The turning member 66 is constantly being urged by a spring 65 to a standby state (an open standby position W) so as to be open relative to the fixed member 74. When the turning member 66 closes against the force of the spring 65, a actuating protuberance 67 pushed by the handle engaging/disengaging part 53 extends to the front of the work machine from the turning member 66. A restraining mechanism 72 automatically restrains the distal end 71 of the turning member 66 with a spring force when the actuating protuberance 67 is pushed further by the handle engaging/disengaging part 53 and the turning member 66 closes (to the closed position K).

In the inside surface of an open end 78 of the fixed member 74, a curved surface part 81 is formed in proximity to the handle engaging/disengaging part 53, as shown in FIGS. 7 and 8A through 8C. A curved surface part 82 in proximity to the handle engaging/disengaging part 53 is formed in the inside surface of the distal end 71 of the turning member 66. The turning member 66 is coupled with the fixed member 74 by a coupling pin 84. The coupling pin 84 is a fulcrum of the turning member 66 and is also a fulcrum of the clamp body 64.

The restraining mechanism 72 comprises a fixed pawl 86 formed on the distal end 71 of the turning member 66, and a movable pawl member 88 turnably (in the direction of arrow a5) attached to the fixed member 74 so as to engage with the fixed pawl 86 due to the spring force of a return spring 87.

The movable pawl member 88 interlocks with the fixed pawl 86 of the turning member 66, and holds the turning member 66 in the closed position K of the clamp body 64 against the spring 65 which turns the turning member 66 in an opening direction.

The spring 65 used in the clamp body 64 is a helical torsion spring, and the direction of the torsion load (the direction of arrow a6 in FIG. 5) is made to coincide with the direction in which the clamp body 64 opens (the direction of arrow a6).

Next, the clamp mechanism 62 of the first embodiment will be described.

The clamp mechanism 62 is composed of the previously described clamp body 64 (the fixed member 74, the turning member 66, the coupling pin 84, and the spring 65), the actuating protuberance 67 formed on the clamp body 64, and the restraining mechanism 72. K is the closed position of the clamp mechanism 62, the closed position of the clamp body 64, and also the closed position of the turning member 66.

The length of the clamp mechanism 62 is L as shown in FIG. 2, and this length L is approximately 2.3 times the outside diameter of both the handle 22 and the handle engaging/disengaging part 53. The length L is also the length of the fixed member 74 (FIG. 8B).

Figure 8A:
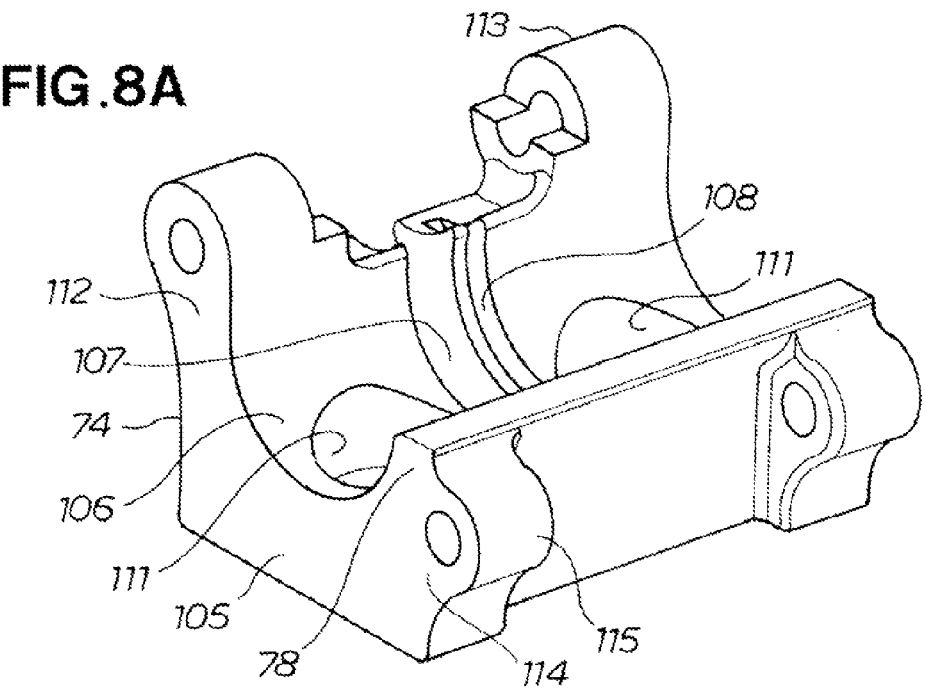
FIG. 8A is a perspective view showing a fixed member of a clamp body shown in FIG. 7.
Figure 8B:
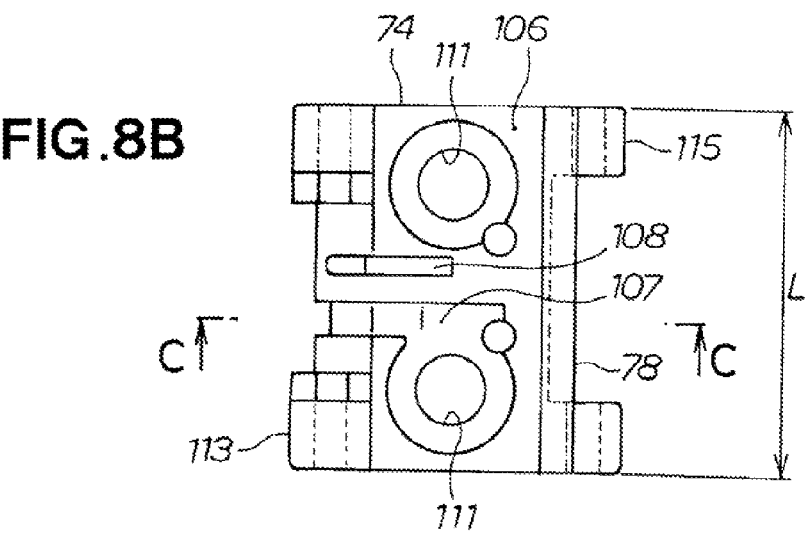
FIG. 8B is a top plan view showing the fixed member.
Figure 8C:
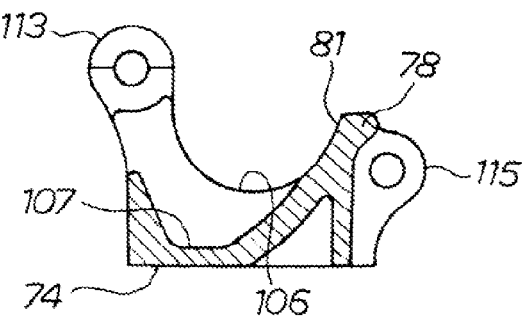
FIG. 8C is a cross-sectional view taken along line c-c of FIG. 8B.

The fixed member 74 has a base main body 105 fixed to the top cross frame part 32 of the frame 13 as shown in FIGS. 7 and 8A. In the base main body 105, a pressure-bearing groove 106 is formed into a shape that fits over the handle engaging/disengaging part 53, and is also formed running along the handle engaging/disengaging part 53.

In the longitudinal (widthwise) center of the pressure-bearing groove 106, an accommodating part 107 is formed to a depth which accommodates the actuating protuberance 67, and near the accommodating part 107 an engaging concavity 108 is formed into a shape which engages the end of the spring 65.

In both dies of the pressure-bearing groove 106 in the width direction, holes 111 are formed through which fastening bolts 109 (FIG. 5) are inserted. The longitudinal direction (the width direction) of the pressure-bearing groove 106 is made to coincide with the longitudinal direction (the width direction) of the handle engaging/disengaging part 53.

The base main body 105 has a first base hinge part 113 formed in the side of a first divided end 112, and a second base hinge part 115 formed in the side of a second divided end 114 (the open end 78).

The top surface of the second divided end 114 substantially coincides with a line E passing through the center of the radius r1 of the handle engaging/disengaging part 53 as shown in FIG. 7. The depth of the pressure-bearing groove 106 substantially coincides with the external peripheral radius r1 of the handle engaging/disengaging part 53. The peripheral length of the pressure-bearing groove 106 is approximately 50% of the external peripheral length of the handle engaging/disengaging part 53. The turning member 66 is coupled with the first base hinge part 113 by a coupling pin (including a retaining ring).

Figure 10C:
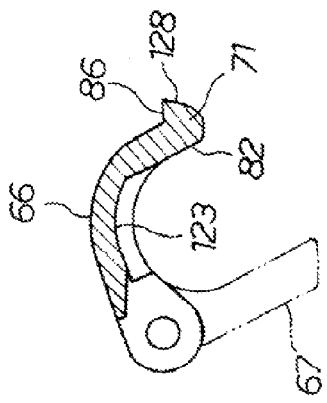
FIG. 10C is a cross-sectional view taken along line c-c of FIG. 10A.
Figure 10B:
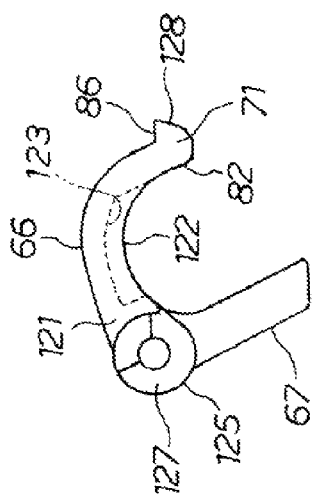
FIG. 10B is a side view of the turning member as seen in the direction of arrow b of FIG. 10A.
Figure 10D:
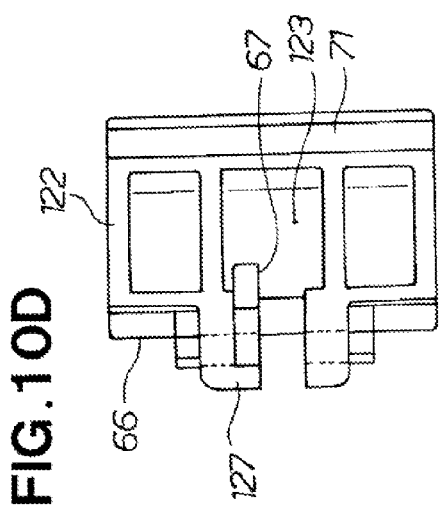
FIG. 10D is a bottom view showing the turning member as seen in the direction of arrow d of FIG. 10B.
Figure 10A:
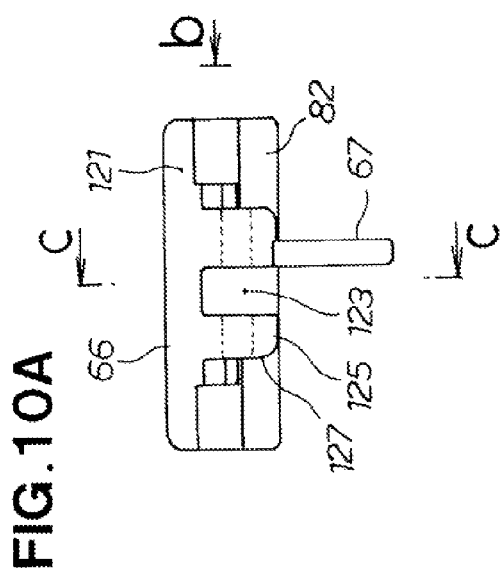
FIG. 10A is a front view showing the turning member of FIG. 7.

The turning member 66 has a pressing groove 122 formed in a turning main body 121 so as to face the pressure-bearing groove 106, as shown in FIGS. 7, 9, and 10B. The pressing groove 122 is formed into a curved shape along the longitudinal direction of the handle engaging/disengaging part 53 so that the handle engaging/disengaging part 53 fits therein.

In the longitudinal center of the turning main body 121, a concave part 123 is formed for engaging the end of the spring 65. A third divided end 125 and a fourth divided end (a distal end 71) are formed in the turning main body 121. The third divided end 125 is formed so that a first hinge part 127 is coupled with the first base hinge part 113 by the coupling pin 84.

A push surface 128 is formed as a continuation of the fourth divided end (the distal end 71) so as to push on the movable pawl member 88. The fixed pawl 86 is formed as a continuation of the push surface 128. The actuating protuberance 67 is formed as a continuation of the third divided end 125.

The actuating protuberance 67 extends toward the handle engaging/disengaging part 53 in a state in which the clamp body 64 (the turning member 66) of the clamp mechanism 62 has been opened (the open standby position W). When the actuating protuberance 67 is pushed by the handle engaging/disengaging part 53, the actuating protuberance 67 turns and pushes on the movable pawl member 88 via the push surface 128 provided to the fourth divided end (the distal end 71).

Figure 11A:
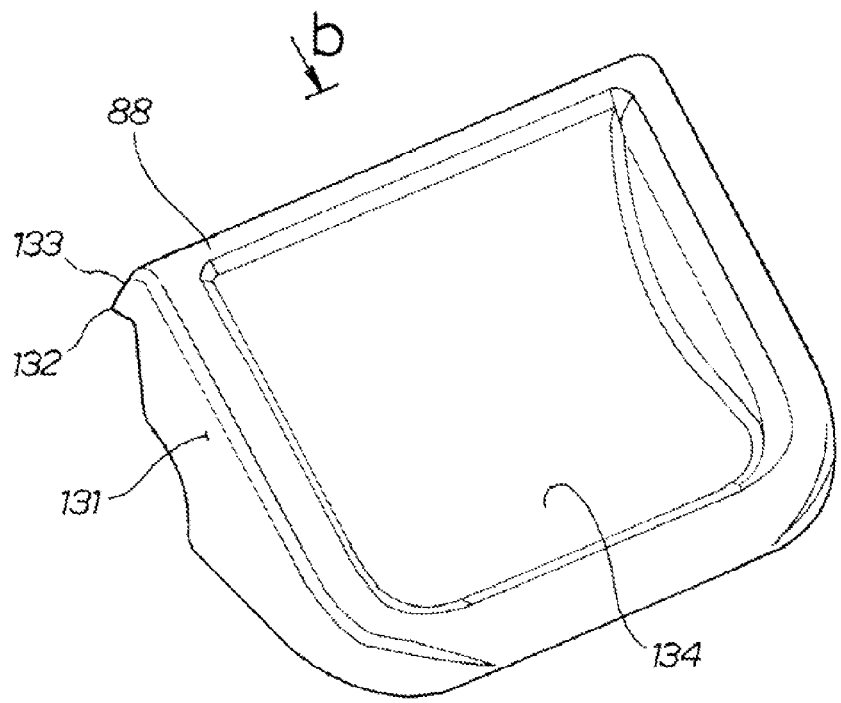
FIG. 11A is a perspective view showing a movable pawl member of a restraining mechanism shown in FIG. 7.
Figure 11B:
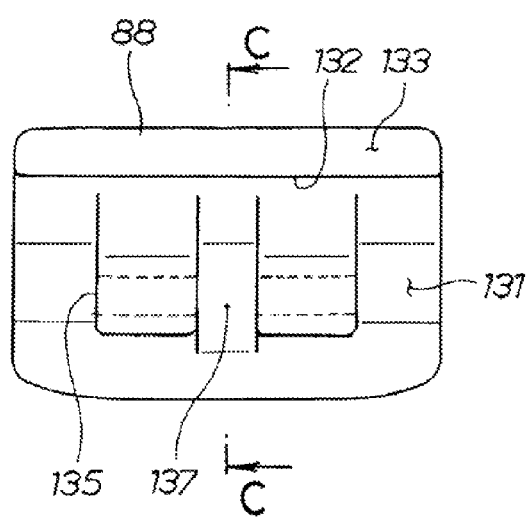
FIG. 11B is a view showing the movable pawl member of FIG. 11A, as seen in the direction of arrow b of FIG. 11A.
Figure 11C:
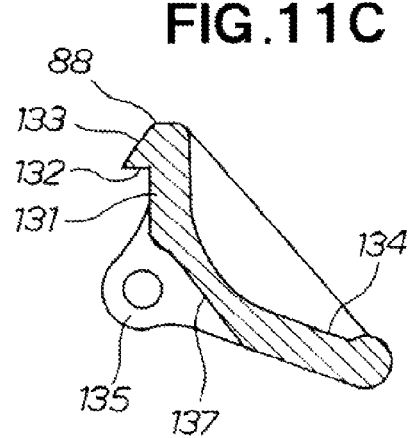
FIG. 11C is a cross-sectional view taken along line c-c of FIG. 11B.

A movable pawl 132 of the movable pawl member 88 is formed on one end of a main body 131 as shown in FIGS. 11A and 11C. A contact surface 133 is formed as a continuation of the movable pawl 132. In the other end side of the main body 131, an operating part 134 is formed so that it can be pushed by hand.

A second hinge part 135, which is formed in the center of the main body 131 between the movable pawl 132 and the operating part 134, is coupled with the second base hinge part 115 by a coupling pint 136. A concave part 137, which engages one end of the return spring 87, is formed in proximity to the second hinge part 135. The other end of the return spring 87 is in contact with the base main body 105 of the fixed member 74. The return spring 87 is a helical torsion spring.

Next, the action of the handle device 21 of the work machine 11 according to the first embodiment will be described.

With this handle device 21, when the handle 22 is turned from the folded position S to the use position U as shown by arrow b1 in FIG. 1, the handle engaging/disengaging part (the stopper part) 53 of the handle 22 is automatically locked by the clamp mechanism 62.

Specifically, when the handle 22 is folded up as shown in FIG. 12A, the clamp mechanism 62 is opened and kept in the open standby position W by the spring 65. To bring the handle 22 to the use state, the handle 22 turns in the direction shown by arrow b1.

The handle engaging/disengaging part 53 then comes in contact with the actuating protuberance 67 of the turning member 66 of the clamp mechanism 62, as shown in FIG. 12B.

When the handle 22 is turned further, the handle engaging/disengaging part 53 pushes on the actuating protuberance 67, and the actuating protuberance 67 therefore begins the turn about a hinge (the first base hinge part 113 and the first hinge part 127) against the spring 65 as shown by arrow b3 in FIG. 12C. At the same time, the turning member 66 also begins to turn in the direction shown by arrow b3.

Furthermore, when the handle 22 is turned, the push surface 128 connected to the distal end 71 of the turning member 66 pushes on the contact surface 133 of the movable pawl member 88, and the movable pawl member 88 therefore begins to turn about a hinge (the second base hinge part 115 and the second hinge part 135) in the direction shown by arrow b4 against the return spring 87, as shown by the double-dashed lines. As a result, interference between the movable pawl member 88 and the distal end 71 of the turning member 66 can be prevented.

When the actuating protuberance 67 is then pushed by the handle engaging/disengaging part 53 and the actuating protuberance 67 and the turning member 66 (the turning main body 121) turn further, the actuating protuberance 67 moves into the accommodating part 107 of the fixed member 74. The distal end 71 of the turning member 66 then comes in contact with or draws near to the second divided end 114 (the open end 78) of the fixed member 74 (the base main body 105).

The turning member 66 reaches the closed position K as shown in FIG. 7 and the push surface 128 therefore separates from the contact surface 133. The movable pawl member 88 turns in the direction of arrow b5 shown in FIG. 12C, and the fixed pawl 86 of the turning member 66 engages with the movable pawl 132.

Therefore the handle engaging/disengaging part 53 is automatically fixed (locked) to the frame 13 in the use position U.

Conversely, when the handle 22 is folded up, when the operating part 134 of the movable pawl member 88 of the clamp mechanism 62 is pushed against the return spring 87 as shown by arrow b6 in FIG. 7, the movable pawl member 88 turns as shown by the double-dashed line, and the movable pawl 132 separates from the fixed pawl 86.

When the handle 22 is then turned to the folded position S (FIG. 1), the turning member 66 of the clamp mechanism 62 turns as shown by arrow b7 due to the spring 65, and opens as shown by the double-dashed lines (the open standby position W). Specifically, the turning member 66 of the clamp body 64 turns in synchronization with the movement of the handle engaging/disengaging part 53, and is thereafter held in the open standby position W by the spring 65.

Thus, since the handle device 21 according to the first embodiment comprises the clamp mechanism 62, it is easy to fix the handle 22 in the use position U. Furthermore, since the clamp mechanism 62 is composed of the clamp body 64, the actuating protuberance 67, and the restraining mechanism 72, the structure is simplified.

Since a long distance is integrally set from the fulcrum (the handle turning mechanism 61) of the handle 22 to the handle engaging/disengaging part (the stopper part) 53, the load imposed on the handle engaging/disengaging part 53 can be lessened without compromising the simplicity of the structure.

Second Embodiment

Figure 13:
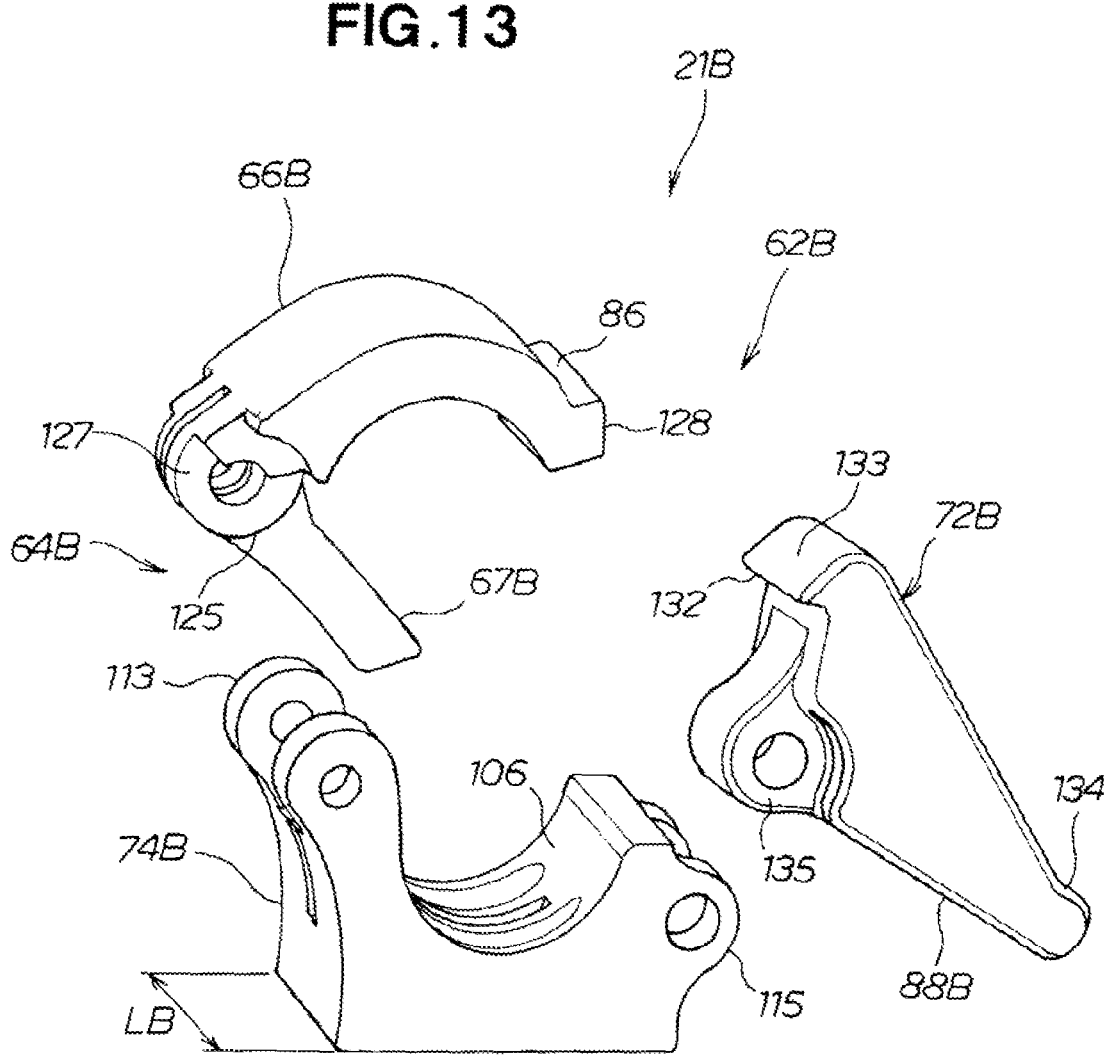
FIG. 13 is an exploded perspective view of a crank mechanism according to a second embodiment of the present invention.

Next, the handle device of the work machine according to a second embodiment will be described based on FIG. 13. Components similar to those of the first embodiment are denoted by the same symbols and are not described.

A handle device 21B according to the second embodiment comprises a clamp mechanism 62B. The clamp mechanism 62B is composed of a clamp body 64B (a fixed member 74B, a turning member 66B, and a spring 65 (FIG. 7)), a actuating protuberance 67B formed on the clamp body 64B, and a restraining mechanism 72B.

The clamp mechanism 62B has a width LB that is shorter than the width L of the clamp mechanism 62 of the first embodiment. The width LB of the clamp mechanism 62B is about 30% of the length of the clamp mechanism 62 according to the first embodiment.

The handle device 21B according to the second embodiment exhibits the same actions and effects as the handle device 21 according to the first embodiment.

Since the handle device 21B according to the second embodiment is shorter in width than the clamp mechanism 62 of the first embodiment, the weight of the clamp mechanism 62B can be reduced, and the weight of the work machine 11 can be effectively reduced.

The handle device of the work machine according to the present invention is suitable for mobile power generators and pumps.

Obviously, various minor changes and modifications of the present invention are possible in light of the above teaching. It is therefore to be understood that within the scope of the appended claims the invention may be practiced otherwise than as specifically described.

What is claimed is:

1. A handle device of a work machine, comprising:
a frame for carrying a work device, said frame comprising a cross-frame part;
a transportation/movement handle attached in a foldable manner to the frame, having left and right grip parts at distal ends thereof, and having a U-shaped support part at a proximal end thereof, the U-shaped support part including a handle engaging/disengaging part;
at least two handle turning mechanisms, each of which support one of left and right attachment parts of the handle, the left and right attachment parts of the handle intersecting the cross-frame part of the frame at a handle support part such that the handle can turn about the handle support part of the cross-frame part as a turning fulcrum; and
a clamp mechanism for detachably fixing the handle engaging/disengaging part to the frame,
wherein the handle engaging/disengaging part is spaced from the left and right attachment parts and is at a center of an end of said U-shaped support part, the U-shaped support part being opposite the left and right grip parts,
wherein the handle engaging/disengaging part of the handle is disposed on an opposite side of the left and right attachment parts relative to the grip parts, in a proximal-distal direction of said handle, and wherein the clamp mechanism comprises:
- a clamp body for clamping the handle engaging/disengaging part by closing;
- a spring of the clamp body, for holding the clamp body in an open standby state;
- an actuating protuberance which, when closed against a spring force of the spring, extends from a turning member of the clamp body toward the handle engaging/disengaging part so as to contact and be pushed by the handle engaging/disengaging part; and
- a restraining mechanism for automatically restraining a distal end of the clamp body by a spring force when the clamp body is closed due to the actuating protuberance being pushed further and brought nearer to the frame.

2. The handle device of claim 1, wherein the clamp body is comprised of a fixed member fixed to the frame and the turning member turnably attached to the fixed member and provided with the actuating protuberance, the fixed member has an open end with an inside surface being curved and in proximity to the handle engaging/disengaging part, and the turning member has a distal end with an inside surface being curved and in proximity to the handle engaging/disengaging part.

3. The handle device of claim 1, wherein the clamp body is comprised of a fixed member fixed to the frame and the turning member turnably attached to the fixed member and provided with the actuating protuberance, and the restraining mechanism is comprised of a fixed pawl formed on a distal end of the turning member and a movable pawl member turnably attached to the fixed member so as to engage the fixed pawl by a spring force of a return spring.

4. The handle device of claim 1, wherein the spring is a helical torsion spring, and a direction of a torsion load coincides with a direction in which the clamp body opens.

5. The handle device of claim 1,
wherein said frame further comprises a second cross-frame part inward of said cross-frame part, and
wherein said clamp mechanism is disposed on said second cross-frame part.

* * * * *